United States Patent [19]

Schaaf

[11] 4,167,240

[45] Sep. 11, 1979

[54] METHOD OF TREATING AN ELECTROPLATING SOLUTION COMPRISING IONS OF GOLD AND CYANIDE PRIOR TO ELECTROPLATING AND THERMOCOMPRESSION BONDING

[75] Inventor: Theodore F. Schaaf, Lawrenceville, N.J.

[73] Assignee: Western Electric Company, Inc., New York, N.Y.

[21] Appl. No.: 810,459

[22] Filed: Jun. 27, 1977

[51] Int. Cl.$^2$ .............................. B23K 19/00
[52] U.S. Cl. ........................... 228/196; 75/107; 75/109; 75/118 R; 204/46 G; 210/45; 210/50; 228/124; 228/211; 423/29
[58] Field of Search ............. 75/118 R, 109, 107, 75/100; 156/151; 423/24, 29; 427/216, 217; 204/46 G; 210/42, 45, 50, 51; 252/476; 228/196, 124, 211

[56] References Cited

U.S. PATENT DOCUMENTS

| 176,813 | 5/1906 | Rogers | 75/118 R |
|---|---|---|---|
| 1,128,313 | 2/1915 | Hybinette | 75/117 |
| 1,492,282 | 4/1924 | Becker et al. | 75/109 |
| 1,555,615 | 9/1925 | Weber | 75/118 R |
| 2,079,597 | 5/1937 | Allingham | 75/109 |
| 2,477,443 | 7/1949 | Dahlgren et al. | 75/107 |
| 2,810,638 | 10/1957 | Hazen | 75/107 |
| 3,744,995 | 7/1973 | Mackay | 75/109 |
| 3,778,252 | 12/1973 | Wilson | 75/101 R |
| 3,941,870 | 3/1976 | Ekstrom et al. | 252/476 |
| 3,943,069 | 3/1976 | Antonelli et al. | 252/476 |
| 3,957,506 | 5/1976 | Lundguist et al. | 75/108 |
| 3,984,598 | 10/1976 | Sarazin et al. | 156/151 |

OTHER PUBLICATIONS

Latimer, W. The Oxidation States of the Elements and Their Potentials in Aqueous Solutions, Prentice-Hall Inc., Englewood Cliffs, N.J., (1952), pp. 195, 347.
The Condensed Chemical Dictionary, copyright 1966, by Reinhold Publishing Corp., Seventh Edition, revised by Author & Elizabeth Rose, State College, Pa., pp. 367-368.

Primary Examiner—Jerome W. Massie
Attorney, Agent, or Firm—Joel F. Spivak

[57] ABSTRACT

A method of treating a solution comprising ions of gold and cyanide is disclosed. The method comprises treating the solution with metallic gold to precipitate therefrom metallic silver.

7 Claims, 2 Drawing Figures

METHOD OF TREATING AN ELECTROPLATING SOLUTION COMPRISING IONS OF GOLD AND CYANIDE PRIOR TO ELECTROPLATING AND THERMOCOMPRESSION BONDING

BACKGROUND OF THE INVENTION

1. Field of the Invention

This invention relates to a method of treating a solution comprising ions of gold and cyanide and more particularly, to a method of purifying the solution by treating it with metallic gold which precipitates metallic silver therefrom if silver ions are present therein.

2. Discussion of the Prior Art

It is known that small amounts of metallic impurities on gold plated surfaces lead to thermocompression bonds thereto which are defective. It appears that the chief culprit is metallic silver impurities on the gold plated surface. In this regard, reference is made to Physical Electronics Industries, Inc., *APPLICATIONS NOTE*, No. 7310 (3-23-73), entitled "Plating Analysis: TO-5 Headers." A method for preventing the electrodeposition of metallic silver from gold electroplating solutions is therefore needed and is desired.

SUMMARY OF THE INVENTION

This invention relates to a method of treating a solution comprising ions of gold and cyanide and more particularly, to a method of purifying the solution by treating it with metallic gold.

The method comprises treating the solution with metallic gold to precipitate metallic silver therefrom.

DESCRIPTION OF THE DRAWINGS

The present invention will be more readily understood by reference to the following drawing taken in conjunction with the detailed description, wherein.

DETAILED DESCRIPTION

Figure 1:
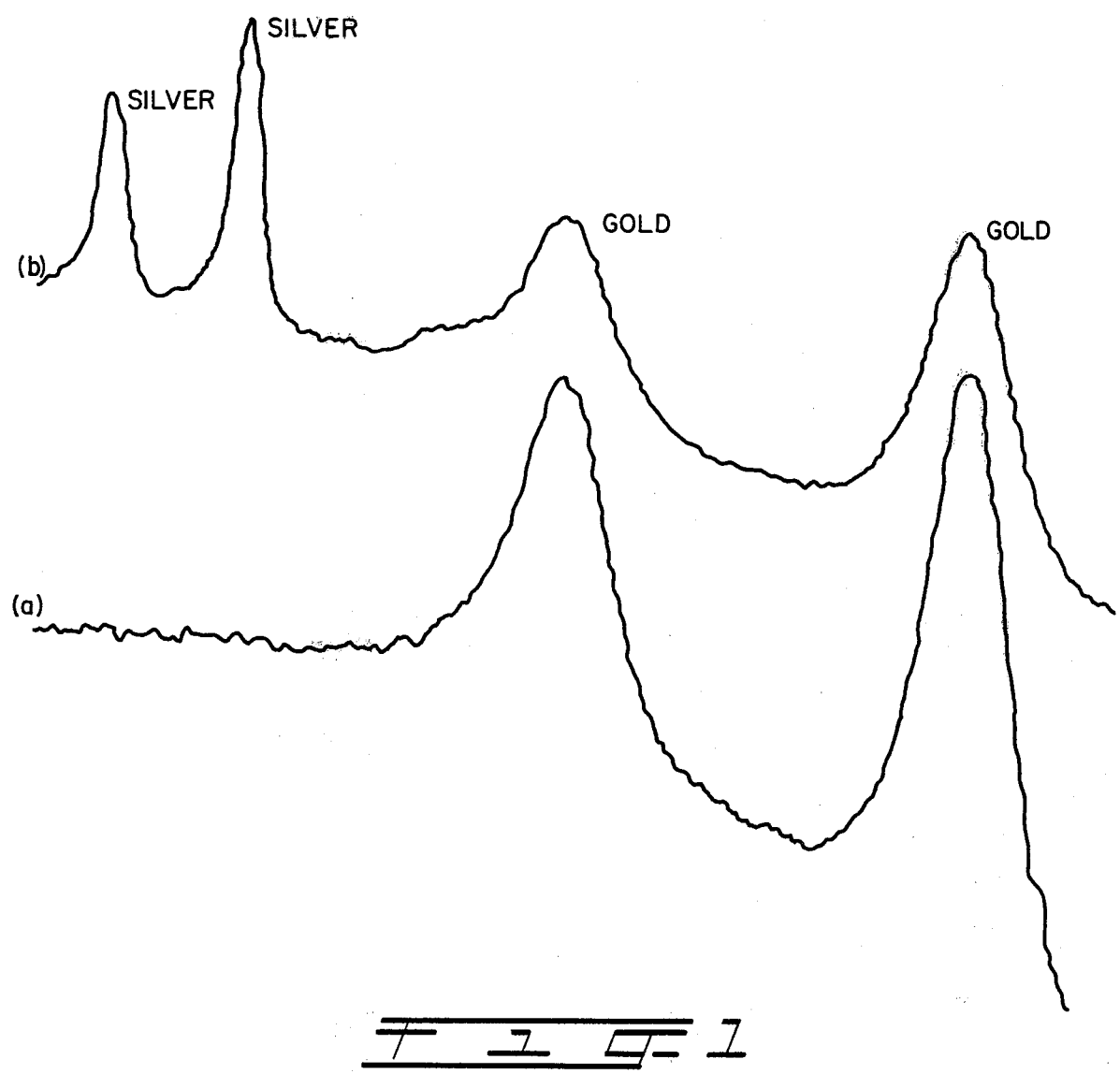
FIG. 1 is an electron spectroscopy for chemical analysis (ESCA) spectra of gold foil which had been immersed in (a) a treated potassium gold cyanide solution and (b) in an untreated potassium gold cyanide solution.

Metallic impurities on the surface of a gold electroplated surface lead to poor thermocompression bonding thereto. It has now been found that this problem is prevalent when the gold is electroplated from an electroplating solution containing cyanide ions. Gold electroplating solutions contain silver ions therein because of the difficulty in separating gold from silver in the preparation of such electroplating solutions. Upon electroplating gold on a surface from such electroplating solutions containing cyanide, it has surprisingly been found that the surface concentration of metallic silver impurity is much higher than the bulk concentration of silver species contained in the electroplating solution.

A mechanism consistent with this surprising result is based on the great stability of the aurocyanide complex and the following immersion reaction:

$$Au° + Ag(CN)_2^- \rightarrow Ag° + Au(CN)_2^- \qquad (1)$$

During electroplating, some silver metal is deposited in the gold plate. However, since the silver concentration in the solution is low, the amount of silver in the bulk deposit is small relative to the amount of gold. However, when the external current is removed, gold ceases to plate, but metallic silver continues to deposit as some gold dissolves leading to a high surface concentration of silver as shown in equation (1), above. As silver covers the surface, the reaction slows and eventually stops. It is of course to be understood that the above mechanism is a hypothesis only and the subject invention is not to be limited thereby.

In order to prevent or decrease the metallic silver deposition, a gold electroplating solution, aqueous or non-aqueous, containing cyanide ions is treated with metallic gold prior to electrodeposition therefrom. A solution comprising dissolved gold, silver and cyanide species, e.g., an aqueous alkali gold cyanide solution such as $KAu(CN)_2$, $NaAu(CN)_2$, an aqueous solution of an ammonium double cyanide of gold, e.g., ammonium aurocyanide, etc., is treated with metallic gold for a period of time, e.g., 10 minutes at 55° C., sufficient to react with the dissolved silver species, e.g., silver ions, present to form metallic silver, as indicated in equation (1) above, and be deposited on the gold. Preferably, the surface area of the metallic gold employed should be large enough whereby a sufficient amount of silver species is removed from the solution as deposited silver metal. Typically, the metallic gold is in particulate form, having the largest practical surface area, and is typically dispersed and retained on a chemically inert carrier member, e.g., alumina particles having a particle size of about 20 to about 60 microns.

The solution is treated with the metallic gold using any conventional technique. For example, the gold metal, e.g, particulate gold metal, may be added to the solution and dispersed therein or alternatively the solution can be passed through a conventional chromatographic column containing gold metal affixed to alumina particles.

The pH of the solution containing gold ions, silver ions and cyanide ions, to be treated with the metallic gold, may vary over a wide range, being either acidic, neutral or basic. Depending upon the makeup of the solution which is to be treated, adjustment of the pH may be done by the addition of various acids, e.g., acetic acid, citric acid, etc.; bases, e.g., sodium hydroxide, sodium carbonate, etc.; or salts, e.g., potassium citrate, potassium acetate, etc., to the solution.

The temperature at which the solution is maintained during treatment with the metallic gold may vary over a wide range, the only criteria being that at the temperature used the solution remain liquid. Thus temperatures within the range of above 0° C. to below 100° C. for aqueous solutions are suitable. It is of course understood that with higher temperatures and/or agitation the rate of the reaction between the metallic gold and the silver species, e.g., silver ions, in the solution being treated, will increase.

After the silver metal is deposited on the metallic gold, the solution is separated therefrom, e.g., as by filtering, and the silver deposited gold metal may be further treated to remove the silver therefrom. The silver-deposited metallic gold surface may be stripped of metallic silver to partially regenerate its activity (some gold is lost by replacing silver) by treatment thereof with a suitable selective etchant. Aqueous solutions of nitric acid, e.g., 32.5 weight percent, and basic ammonium persulfate, e.g., 1.5 weight percent, have been found to selectively remove the deposited silver metal without removing gold.

The resultant separated, essentially silver species-free solution is now in a condition whereby a gold electrodeposition can be obtained therefrom, which is essentially free of the metallic silver metal impurity. A surface of a first member to be gold plated is immersed in the resultant solution and conventional electroplating procedures and equipment are employed to electrodeposit an essentially silver metal-free deposit thereon. The resultant gold plated surface represents a surface to which a second member can be bonded, e.g., by conventional thermocompression techniques, with an improved bond.

In another embodiment, solutions, aqueous or nonaqueous, containing silver and gold species can be treated to remove the silver species therefrom. To such a solution, e.g, an aqueous solution comprising silver iodide, gold (I) iodide and sodium iodide (in an amount sufficient to insure complete dissolution of the silver and gold iodides), is added a sufficient amount of a soluble cyanide source, e.g, potassium cyanide, to combine with the silver species, e.g., silver ions, present to form the $Ag(CN)_2^-$ complex or species. The resultant solution is then treated with metallic gold, as described above, to precipitate and remove the silver species as a metallic silver deposit.

EXAMPLE I

A. One weight percent metallic gold deposited alumina particles were prepared by combining 0.545 gram of $HAuCl_4.2H_2O$, 1.72 grams sodium borohydride, 25.5 grams of commercially obtained chromatographic grade alumina (obtained from the Woehlm Company and designated as "W200 neutral," having a particle size of about 20 to about 60 microns), and 50 grams of $H_2O$. The pH of the mixture was adjusted to 14.2 with NaOH before the addition of the sodium borohydride. The mixture was stirred from 30 minutes at 25° C. to form reduced metallic gold. The resultant reduced gold was deposited on the alumina as a purple colloid (Purple of Cassius).

Forty milliliters of a 1.0 molar aqueous potassium gold cyanide solution was combined with 1.4 grams of the 1% gold deposited alumina at 55° C. The mixture was stirred for 10 minutes whereby the silver species concentration in the solution was reduced from about 0.794 parts per million to about 0.003 parts per million. The treated solution was filtered and a gold metal foil was immersed therein for 98 minutes at 25° C. The gold metal foil was removed and then subjected to a conventional electron spectroscopy for chemical analysis or ESCA examination for silver, using DuPont Model No. 650B ESCA. As shown in FIG. 1, in the spectrum designated as "(a)", the treated or purified solution deposited no detectable silver on the surface of the gold foil.

For comparison purposes, the procedure above was repeated except that the potassium gold cyanide solution was not treated with metallic gold. As shown in FIG. 1, in the spectrum designated as "(b)", a considerable quantity of surface silver was present on the gold foil immersed in the untreated potassium gold cyanide solution.

Figure 2:
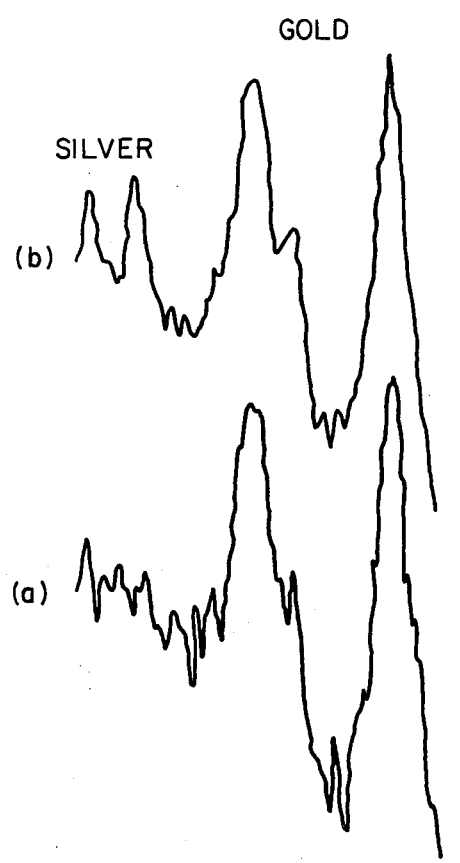
FIG. 2 is an electron spectroscopy for chemical analysis (ESCA) spectra of (a) one weight percent gold metal deposited on alumina which has been used to treat a potassium gold cyanide solution and which in turn has been stripped with 1.5 weight percent ammonium persulfate dissolved in 0.75 molar aqueous ammonium hydroxide and (b) one weight percent gold metal deposited on alumina which has been used to treat a potassium gold cyanide solution but which has not been stripped.

A portion of the filtered 1% gold on alumina particles was then treated with a 1.5 weight percent ammonium persulfate dissolved in 0.75 molar aqueous ammonium hydroxide for 10 minutes at 55° C. The particles were then filtered and water rinsed at 25° C. and subjected to ESCA examination. The remaining portion of the 1% gold on alumina particles was water rinsed and also subjected to ESCA examination. As shown in FIG. 2, in the spectrum designated as "(a)", the deposited silver metal was essentially removed or stripped from the gold deposited alumina particles by the treatment with the ammonium persulfate solution. Comparison in this regard is made to the spectrum of ammonium persulfate untreated particles, designated in FIG. 2 as "(b)".

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A method of treating a solution comprising dissolved species of gold, silver and cyanide which comprises exposing the solution to metallic gold to precipitate metallic silver therefrom.

2. A method of removing a dissolved silver species from a solution comprising dissolved silver and gold species, which comprises:
   (a) adding a source of cyanide ions in an amount sufficient to form a silver cyanide complex; and
   (b) treating said silver cyanide complex containing solution with metallic gold to precipitate therefrom metallic silver.

3. A method of rendering a gold cyanide solution, containing a soluble gold cyanide salt, capable of electrodepositing therefrom an essentially silver-metal-free gold deposit, which comprises:
   (a) treating the solution with metallic gold; and
   (b) removing essentially all free metals from said treated solution.

4. A method of forming an electroplated gold deposit on a surface having improved bondability thereto, which comprises:
   (a) treating an electroplating solution, containing a dissolved gold cyanide salt, with metallic gold;
   (b) removing free metallic species from said treated electroplating solution; and
   (c) electroplating the surface with said resultant metallic species removed solution to form the gold deposit thereon.

5. A method of improving a bond between a first surface and a second surface having an electroplated gold deposit thereon, which comprises:
   (a) treating a gold electroplating solution, containing a dissolved gold cyanide salt therein, with metallic gold to precipitate silver metal therefrom;
   (b) removing said precipitated silver metal to form an essentially silver species free electroplating solution;
   (c) treating the second surface with said silver species free electroplating solution to deposit an essentially silver metal free gold deposit thereon; and
   (d) bonding the first surface to said gold deposited second surface.

6. The method of forming an electroplated gold deposit as recited in claim 4 wherein said step of treating said electroplating solution with metallic gold comprises contacting said solution with a fine particle size inert material having a film of metallic gold on the surface thereof.

7. The method of improving a bond between a first surface and a second surface as recited in claim 5 wherein said step of treating said gold electroplating solution with metallic gold comprises contacting said solution with a fine particle size inert material having a film of metallic gold on the surface thereof.

* * * * *